Oct. 8, 1940.   E. A. HOOPES   2,217,017
TEMPERATURE CONTROLLED WATER MIXER
Original Filed Aug. 23, 1937   2 Sheets-Sheet 1

INVENTOR.
E. A. HOOPES
BY M. Talbert Dick
ATTORNEY.

Oct. 8, 1940.  E. A. HOOPES  2,217,017

TEMPERATURE CONTROLLED WATER MIXER

Original Filed Aug. 23, 1937   2 Sheets-Sheet 2

INVENTOR.
E. A. HOOPES
BY M. Talbert Dick
ATTORNEY.

Patented Oct. 8, 1940

2,217,017

UNITED STATES PATENT OFFICE 2,217,017

TEMPERATURE CONTROLLED WATER MIXER

Ernest A. Hoopes, Des Moines, Iowa, assignor, by direct and mesne assignments, of three-eighths to Arthur W. Erskine, Cedar Rapids, Iowa, and one-eighth to Frank D. Clark, Des Moines, Iowa Application August 23, 1937, Serial No. 160,471
Renewed May 29, 1940

4 Claims. (Cl. 236—12)

The principal object of this invention is to provide a thermostatically controlled water mixer wherein the thermostatic unit merely opens or closes small pin valves which control the pressure on either side of a balancing unit so that the incoming water pressure is utilized for the opening or closing of the valves admitting the hot or cold water from the line.

A further object of this invention is to provide a temperature controlled water mixer that mixes the hot and cold water adjacent and surrounding the thermostatic element so that a uniform control of outgoing water temperature will be maintained without the use of a dash pot or similar delaying means.

A still further object of my invention is to provide a thermostatically controlled water mixer that provides for the use of a light, sensitive thermostat of great flexibility.

Further objects of my invention is to provide a temperature controlled water mixer that is extremely sensitive to minute variations in the temperature of water, rapid in its operation, uniform in the delivery of the desired temperature of water, and that will automatically shut off the flow of water if the hot or cold water is stopped for any reason.

A still further object of this invention is to provide a controlled temperature water mixer that filters the incoming water and that may be cleaned by the application of a solvent in the filtering system.

A still further object of my invention is to provide a thermostatically controlled water mixer that is compact, flexible and positive in its operation.

A still further object of this invention is to provide a temperature controlled water mixer that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

There are a number of water mixing units on the market. In general these units are bulky due to the crude design of the thermostatic element, do not accurately control the temperature of the outgoing water, and are erratic in their function. Many of these devices depend upon a dash pot to mix the water before it flows to the thermostatic element, thereby inducing considerable lag in the control of the water temperature and allowing the mixed water a continuous fluctuation of temperature so that the temperature of the delivered water is not regular nor uniform. Futhermore, when the water contacts the thermostatic unit or element, the action of the element is forced to stand the strain of opening or closing a valve to permit the exclusion or entrance of the water at line pressure. This not only imparts an undue strain on the thermostatic element but also, due to the sensitivity of these elements, any flaw or corrosion of the valve mechanism will make it impossible for the thermostatic element to assume the burden. Therefore, there is always the possibility of receiving water from the outlet side of the device of an unsuitable temperature due to this malfunction and the lack of inherent strength in such devices.

Furthermore, the thermostatic element of these devices is required to flex or expand a great distance in order to open or close the valve thus necessitating the use of a heavy thermostat lacking sensitivity and causing a delay in the action of the valve. I have overcome these disadvantages as will be appreciated and as hereinafter more fully set forth.

Figure 1:
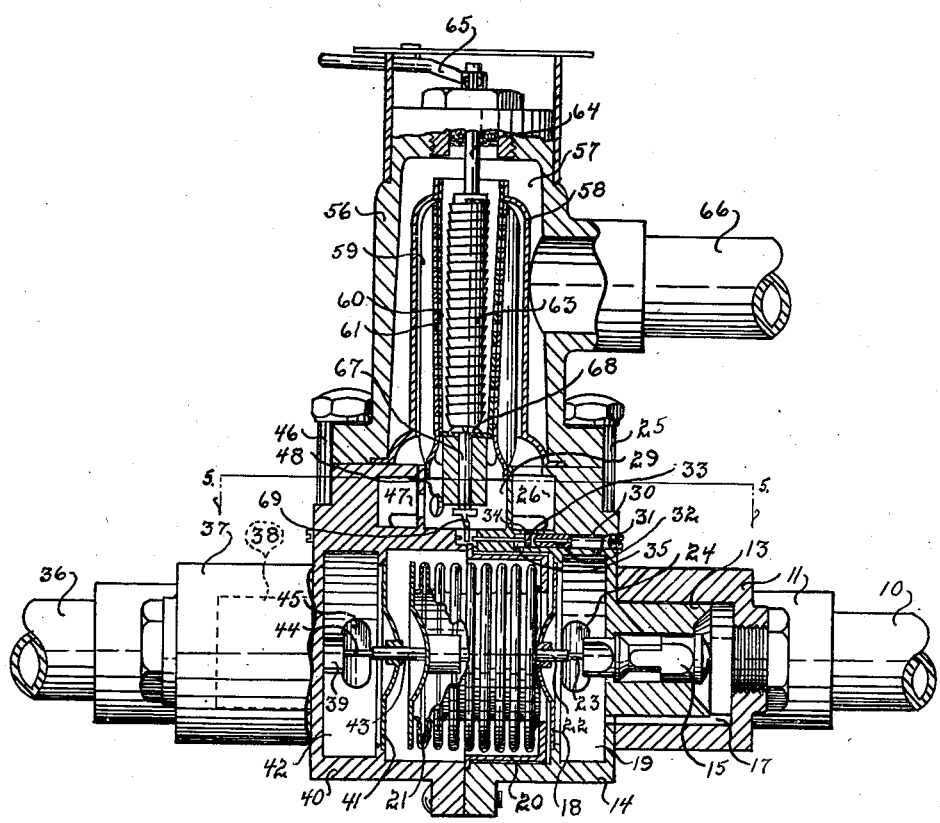
Fig. 1 is a side sectional view of my controlled temperature water mixer ready for use.
Figures 2, 3:
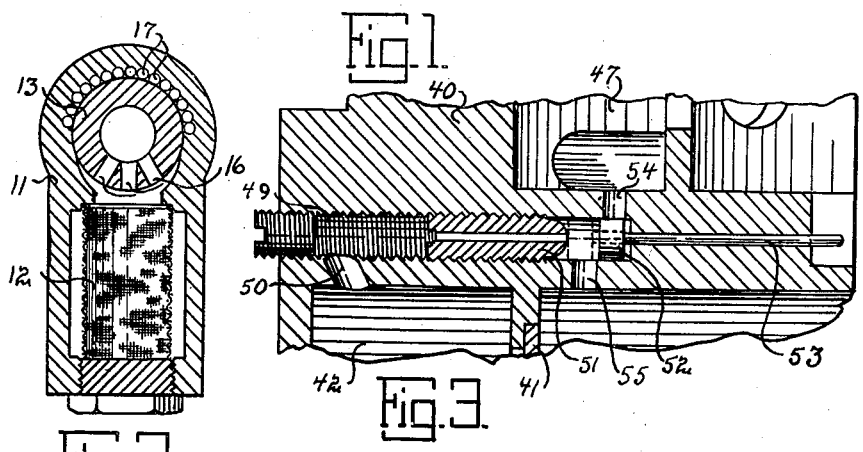
Fig. 2 is a side end sectional view of one of the intake filters of my device, showing their construction.
Fig. 3 is an enlarged side cross sectional view of a portion of my device showing the valve mechanism for admitting water into the balance bellows or booster for controlling the amount of hot or cold water consistent with the temperature setting of the thermostatic unit.

Referring to the drawings, I have used the numeral 10 to designate the hot water intake pipe of my device designed to have one end in communication with a source of hot water under pressure. The numeral 11 designates a housing having in one end a cylindrical screen unit 12. This housing 11 has its lower end portion enlarged, interiorly, to a diameter greater than the diameter of the screen 12. It is into this enlarged portion of the housing 11 on the outside of the cylindrical screen 12 that the hot water enters the device from the pipe 10. The upper end portion of the device is fitted to a stem 13 as shown in Figs. 1 and 2. Integrally formed on one end of the stem 13 is the hot water cup or shell 14. I have used the numeral 15 to designate a balanced valve seated and slidably mounted within the stem 13. The numeral 16 designates a plurality of passageways in communication between the inside of the screen 12 and the other side of the stem 13 as shown in Fig. 2. These passageways 16 admit water which has passed through the screen 12 into the central portion of the stem 13 and about the balanced valve 15. The numeral 17 designates a plurality of passageways in communication between the inside of the cup portion 14, extending adjacent the stem 13 for admitting water back from the chamber or shell 14 to the end portion of the stem 13 as shown in Fig. 1. It will here be noted that the housing 11 is rigidly secured to the stem 13 in a suitable manner such as by the use of solder and sweating the housing 11 onto the stem 13 in order that there be no passage of water between the holes 17 and the holes or passageways 16 when the valve 15 is in a closed position.

The numeral 18 designates a header plate placed within the shell portion 14 for the purpose of providing a chamber 19 in communication with the passageway of the balance valve chamber for receiving the incoming hot water when the valve 15 is in an open position.

I have used the numeral 20 to designate a cup secured within the shell 14 and having a circular opening in its bottom end portion. Secured to this cup 20 is an ordinary bellows 21. This bellows is sealed within the shell 14 by the cup 20. The numeral 22 designates a stem secured to the bottom portion of the bellows slidably bearinged within the header plate 18 and receiving a stem 23 which is secured to the balanced valve 15. I have used the numeral 24 to designate a passageway in communication between the chamber 19 and one end of a sleeve 25. The numeral 26 designates a semi-circular chamber formed in the forward end of the shell 14 and having a passageway therein in communication with the inside of the other end of the sleeve 25. Slidably mounted within this sleeve 25 is a ball valve 27 which yieldingly closes the passage in the sleeve 25 between the two chambers by means of an ordinary spring 28 so that when water is admitted through the balanced valve 15 into the chamber 19, this valve 27 will open, admitting water through the passageway into the semi-circular chamber 26 and will stop the flow of water into the semi-circular chamber 26 the instant the valve 27 is closed relieving the pressure within the chamber 19. This ball valve 27 serves a double purpose. The spring 28 is of such a tension as to build up a pressure within the chamber 19 to effectively operate the small valve 33 and the bellows 21. The other purpose for which this valve is used is as a check valve to prevent the siphoning of water between the hot and cold pipes as is necessary on all units having inlets of hot and cold water.

This forward end of the housing or shell 14 also has a semi-circular partition 29 for dividing the inner passageway from the semi-circular chamber 19. Positioned within the forward wall of the shell 14 between the chambers 19 and 26 is a passageway 30 closed at its outward end by an ordinary cap screw and in communication with the chamber 19 through the medium of a hole 31. Positioned inwardly or on the other side of the hole 31 from the cap screw is a plug 32 having a small hole through its center as shown in the drawings. Positioned on the inward end of the passageway 30 is a valve head 33 having an elongated stem portion slidably mounted in the shell 14 and having its other end projecting from the shell 14 on its inward face. The numeral 34 designates an opening in communication between the inside passageway 30 and the chamber 26. The numeral 35 designates a passageway in communication between the passageway 30 and the inside of the bellows 21. This hole 35 is positioned on the other side of the valve head 33. The action of this valve mechanism will hereinafter be described. I have used the numeral 36 to designate the cold water inlet pipe of my device having one end in communication with a suitable source of cold water under pressure and its other end in communication with the housing 37 of identical construction with the stem 15, and having therein a balanced valve 39 as shown in the drawings. The stem 38 is integrally formed on a cup or shell portion 40 and has therein a header plate 41 for forming a compartment 42 in the end portion of the shell 40. The numeral 43 designates a hollow stem secured to the other face of the bellows 21 slidably mounted in the header 41 and operatively engaging a stem 44 for operating the balanced valve 39. The outer or open end of the shell 40 contacts the open end of the shell 14 forming the shells 14 and 40 into one solid unit which embraces the bellows 21 as shown in Fig. 1 of the drawings.

The numeral 45 designates a passageway in communication between the chamber 42 and a valve sleeve 46 which is identical in structure to the valve mechanism contained within the sleeve 25 having the usual ball valve therein and its other end in communication with a chamber 47. This chamber 47 is partitioned from the chamber 26 and enters into a sleeve or partition 48 through the holes or the like which, when the shells 40 and 14 are placed together, forms an outlet passageway with the shell member 29. Thus hot water entering the chamber 26 is conducted out of the chamber through the outer semi-circular opening while the cold water entering the chamber 47 is conducted out of that chamber through the central portion of the shell 29, thus keeping the hot and cold water separated from each other. Similarly, I have used the numeral 49 to designate a passageway within the shell 40 between the chamber 42 and the chamber 47, in communication with the chamber 42 through a passageway 50 and closed on its outward face by an ordinary cap screw as shown in Fig. 3. Positioned on the other side of the passageway 50 from the plug screw is a plug 51 having a reduced opening or orifice bored longitudinally through its center. The numeral 52 designates a valve head slidably mounted within the passageway 49 adjacent the other end of the plug 51. This valve head 52 has integrally formed thereon an elongated shaft 53 which is slidably mounted in the shell 40 and projects into an opening which normally rests between the shells 40 and 14 as shown in the drawings. I have used the numeral 54 to designate a passageway in communication with the passageway 49 a distance from the end of the plug 51.

The numeral 55 designates a second passageway in communication between the passageway 49 and that portion of the shell 40 embracing the bellows 21.

When there is water under pressure in the chamber 42, it passes through the hole 50 into the passageway 49, thence through the orifice in the plug 51 forcing the valve head 52 to its extreme position. This allows water to enter through the hole 55 into that side of the bellows for closing the balance valve 39. When pressure is applied against the end of the stem 53, the valve head 52 will close the orifice in the plug 51, allowing the water that has been forcing the bellows to a closed position to escape into the chamber 47, through the hole 54. As the valve 52 is closed, a similar action is set up within the passageway 30 opening the valve head 33 for admitting water behind the cup and to the other side of the bellows for closing the balanced valve 15 and opening the balanced valve 39. Thus as these valves 33 and 52 are operated, pressure is applied to either side of the bellows and relieved from the other side of the bellows until the valves are moved to an alternate position, in which case the water that has been on one side of the bellows may escape and pressure is applied to the other side of the bellows. This action operates the balanced valves 15 and 39 for the admittance of the desired amount of either hot or cold water as required. The amount of water flowing into the bellows is very small in comparison to the total flow of either hot or cold water. It will here be noted that the bellows divide the central portions of the shells 14 and 40 into two separate compartments and the bellows is actuated by the amount of pressure applied on either of its sides for manipulating the balanced valves 38 and 39 respectively as herebefore described.

Figure 4:
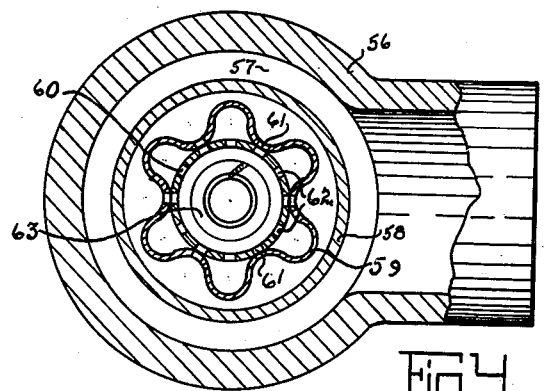
Fig. 4 is an enlarged end sectional view of the thermostatic unit and water mixing portion of my device and more fully illustrates its construction.
Figure 5:
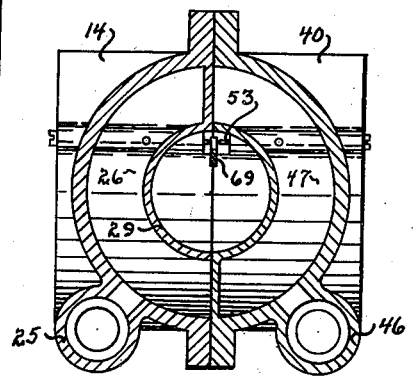
Fig. 5 is an enlarged cross sectional view of a portion of my device and is taken on the line 5—5 of Fig. 1.
Figure 6:
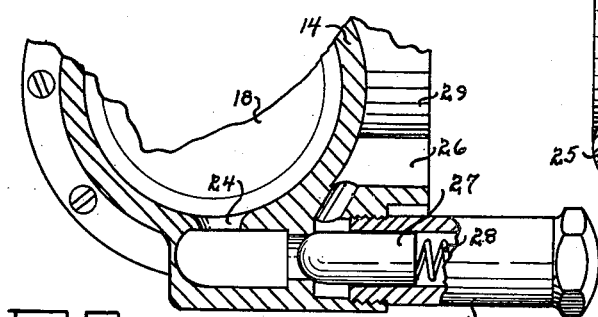
Fig. 6 is an enlarged cross sectional view of one of the inlet valve mechanisms for selectively admitting water to the mixing portion of the device.
Figure 7:
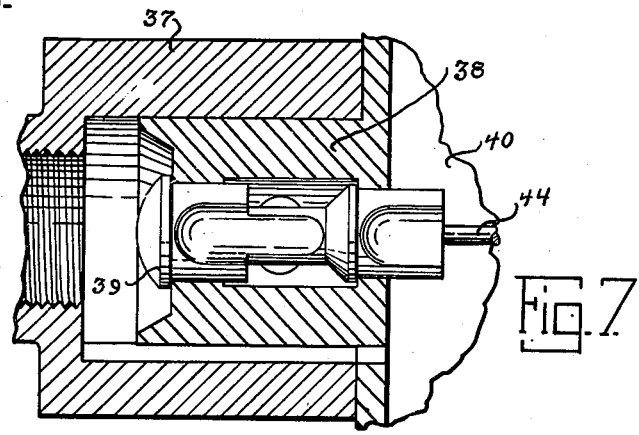
Fig. 7 is an enlarged sectional view of one of the intake portions of my device showing one of the balanced valves and more fully illustrating its construction.

Rigidly secured to the forward face, adjacent the outlet portions of the shells 14 and 40, is a sleeve 56 having a hollow inside chamber 57 as shown in Fig. 1 of the drawings. It is within this chamber 57 that I place the mixing portion and thermostatic control of my device which I will now describe. I have used the numeral 58 to designate a sleeve mounted within the chamber 57 having one of its ends open and in communication with the chamber 26 of the shell 14. This sleeve 58 has its upper end portion reduced and necked as shown in the drawings. I have used the numeral 59 to designate a longitudinally corrugated conductor tube. This conductor tube has a tapered cylindrical tube 60 secured to its inner surface and secured at its upper portion to the necked portion of the sleeve 58. This tube has its bottom end portion closed as shown. It will be noted by reference to Fig. 4 of the drawings that this construction arranges for two separate and complete passageways formed by the corrugated tube 59. The outer side of this corrugated tube is in communication with the chamber 26 or the hot water side of the mixing device, while the inner portion of the corrugation or chamber formed between the ridges and the tube 60 receive water from the inner or cold water conduits, and is in communication with the cold water inlet chamber 29 through the holes 48. The lower end portion of the corrugated tube 59 is flattened so that it fits within the shell 29 as shown in Fig. 1 of the drawings. I have used the numeral 61 to designate passageways in communication between the outside of the corrugated tube 59 and the inside portion of the tube 60. The numeral 62 designates holes extending through the tapered tube 60 in communication with the inside portion of the corrugated tube 59 and the inside of the tapered tube 60. I have used the numeral 63 to indicate a thermostatic element.

This thermostatic element 63 is constructed of a metallic ribbon that is highly sensitive to temperature changes and is helically wound so that each succeeding turn of the ribbon overlaps the one preceding it. This allows each preceding turn to nest within the successive turns as each complete turn of the ribbon is of generally conical shape as shown in the drawings. It will here be noted that the hot water will be conducted from the semi-circular chamber 26 up the outside of the corrugated tube 59 within the sleeve 58 and the cold water will be conducted up the inner portion of the corrugated tube adjacent the tapered tube 60. Hot water will pass through the holes 61 into the central portion of the tube 60 and the cold water will pass through the holes 62 into the interior of the tapered tube. Thus the hot and cold water will be mixed directly adjacent and surrounding the thermostatic element 63 where it will flow in a mixed condition out through the open end of the tube 60 into the chamber 57. The numeral 64 designates a shaft secured to the upper end of the thermostatic element 63 extending out through a common packing nut through the end of the housing or sleeve 56 having on its outward end a handle member 65 to facilitate the manual control of the temperature sensitivity of the thermostatic unit. The numeral 66 designates an outlet pipe in communication with the chamber 57 as shown in the drawings. I have used the numeral 67 to designate a shaft rotatably mounted through the lower closed portion of the tapered tube 60 and having an enlarged head portion 68 for detachably securing this rod to the other end of the thermostatic element 63. Secured to the other end of this shaft 67 is a lug 69 which extends into the cut out portion between the shells 14 and 40 and for contacting the push rods of the valve 33 and 52 at times.

Thus this lug 69 is positioned between the two extreme ends of the elongated rods of the two small pin valves so that with temperature fluctuations within the tube 60 the thermostatic element 63 will expand or contract rotating the shaft 67 and causing the lug 69 to open or close its respective valves. This is all of the work that the thermostatic element has to bear. Therefore, the thermostatic element may be so constructed that it is highly sensitive.

The practical operation of my device is as follows:

The pipes 10 and 36 are connected to a suitable source of hot and cold water under pressure respectively. Due to the balance of the bellows 21, the balanced valves 15 and 39 will be open, admitting water into each of the chambers 19 or 42 of the device. As is usual, cold water is in the pipes when the water is left standing, the water will flow in through the pipes 10 and 36 through the openings 24 and 45 into the chambers 26 and 47. Thus the water mixed upon the thermostatic element 63 will be cold, causing it to contract, thereby moving the lug 69 so that it closes the valve head 33. This allows the valve head 52 to open, admitting water through the passageway 50, the passageway 59, the orifice of the plug 51, through the hole 55 against one end of the bellows 21. This forces the bellows to mechanically collapse, which action opens the balanced valve 15 of the hot water side of the device and closes the balanced valve 39. As the cold water drains from the hot water pipe, the hot water then enters the device through the passageways heretofore shown and contact the thermostatic element 63 within the tube 60. This application of hot water to the thermostatic element causes it to flex, thereby closing the valve head 52 and opening the valve head 33. This action is very fast as only a small amount of water is necessary to act upon the bellows 21.

As the thermostatic element 63 is highly sensitive and does not have to carry any load, it flexes immediately, thus minutely controlling the temperature of the outgoing water. In practice the thermostatic element 63 is continually flexing, opening the desired valve which acts upon the booster or bellows 21 for selectively opening the balance valve mechanisms. In other words, the thermostatic element does not have a great load imposed upon it and the bellows 21 acts as a booster, assuming the work of opening the balanced valves to admit either hot or cold water as called for by the thermostatic element. By having the tube 60 tapered, a greater volume of water can be accommodated through the mixing portion of the device and the water will flow through the pipe 66 thoroughly mixed and of the desired temperature. By moving the handle 65 the shaft 64 is rotated and a different degree of tension is imposed on the metallic ribbon of the thermostatic unit, thereby changing the reaction of the unit 63 so that warmer or cooler water may be had from the pipe 66.

Should it be desired to clean the device, the cylindrical screen 12 may be removed from the housing 11 and filled with some sort of a solvent so that the water in washing through the screen picks up some of the solvent in solution which passes through the device, thereby cleaning it. There is a similar screen arrangement within the housing 37.

Thus I have provided a controlled temperature water mixer that fulfills my objects and that controls the supply of the incoming water by means of a booster, thereby eliminating undue strain on the thermostatic element.

My device is compact, may be cleaned through the introduction of a solvent, is highly sensitive to temperature changes as the water is mixed directly adjacent and surrounding the thermostatic unit. The action of the device is speedy. The water temperature is maintained at a uniform level and it has few parts to wear or break. My device, furthermore, can accommodate water entering either of the pipes at a greater or lesser variation of temperature and the outlet water is thoroughly mixed and of a temperature consistent with the temperature setting of the device. Due to the lack of load imposed upon the thermostatic element, no variation of contraction or expansion will be experienced with this unit, thereby making control uniform over a great length of time.

Obviously, various items may be substituted in my device without impairing its function instead of the bellows 21. A piston may be utilized with equal results. Any type of valve mechanism may be utilized and operated by this piston. In reality the head of the bellows acts as a piston within the chambers 14 and 40 and prevents leakage between the two compartments.

Thus my device is extremely flexible in its utility, constant in its control and fool proof in its structure.

Some changes may be made in the construction and arrangement of my improved temperature controlled water mixer without departing from the real spirit and purpose of my invention, and it is my intention to cover by my claims any modified forms of structure or use of mechanical equivalents which may be reasonably included within their scope.

I claim:

1. In combination with a thermostatic mixing chamber having therein a flexible thermostatic element and means for separately conducting hot and cold fluid thereto, a pressure actuated booster unit comprising, a housing, a cold fluid inlet in said housing designed to be in communication with a source of cold fluid under pressure, a hot fluid inlet in said housing designed to be in communication with a source of hot fluid under pressure, a chamber in said housing adjacent said hot fluid inlet, a second chamber in said housing adjacent said cold fluid inlet, a valve mechanism in each of said hot and said cold fluid inlets for admitting fluid into said hot and said cold fluid chambers respectively at times, a compressible element for actuating said valves and actuated by said thermostatic element, a hot fluid outlet in said housing, a hot fluid conductor in communication with said hot fluid outlet, a cold fluid outlet in said housing, a conductor tube in communication with said cold fluid outlet; said hot and cold conductors being in communication with said means for separately conducting hot and cold fluid to said mixing chamber, a spring actuated valve imposed between said hot fluid chamber and said hot fluid outlet, and a spring actuated valve imposed between said cold fluid chamber and said cold fluid outlet.

2. In combination with a thermostatic mixing chamber having therein a flexible thermostatic element and means for separately conducting hot and cold fluid thereto, a pressure actuated booster unit comprising, a housing, a cold fluid inlet in said housing designed to be in communication with a source of cold fluid under pressure, a hot fluid inlet in said housing designed to be in communication with a source of hot fluid under pressure, a chamber in said housing adjacent said hot fluid inlet, a second chamber in said housing adjacent said cold fluid inlet, a balanced valve mechanism in each of said hot and said cold fluid inlets for admitting fluid into said hot and said cold fluid chambers respectively at times, a compressible element in said housing operatively secured to each of said valves, a passageway in said housing in communication between said hot fluid chamber and one side of said compressible element, a pin valve mechanism imposed in said passageway, a second passageway in said housing in communication between said cold fluid chamber and the other side of said compressible element, a pin valve mechanism imposed in said passageway, a hot fluid inlet in communication with said hot fluid chamber in said housing, a check valve imposed between said hot fluid outlet and said hot fluid chamber, a cold fluid outlet in said housing in communication with said cold fluid chamber, a check valve imposed between said cold fluid outlet and said cold fluid chamber, and a means for operatively securing said thermostatic element to said pin valve mechanism for admitting fluid to either side of said compressible element at times for actuating said valve in said inlets.

3. In a hot and cold fluid mixer, a housing, a cold fluid inlet in said housing designed to be in communication with a source of cold fluid under pressure, a hot fluid inlet in said housing designed to be in communication with a source of hot fluid under pressure, a cylindrical screen unit imposed in said cold fluid inlet, a cylindrical screen unit imposed in said hot fluid inlet, a chamber in said housing adjacent said hot fluid inlet, a second chamber in said housing adjacent said cold fluid inlet, a balanced valve mechanism in each of said hot and said cold fluid inlets for admitting fluids to said hot and said cold fluid chambers respectively at times, a compressible element in said housing operatively secured to each of said valves, a passageway in said housing in communication between said hot fluid chamber and one side of said compressible element, a pin valve mechanism imposed in said passageway, a second passageway in said housing in communication between said cold fluid chamber and the other side of said compressible element, a pin valve mechanism imposed in said passageway, a hot fluid inlet in communication with said hot fluid chamber in said housing, a check valve imposed between said hot fluid outlet and said hot fluid chamber, a cold fluid outlet in said housing in communication with said cold fluid chamber, a check valve imposed between said cold fluid outlet and said cold fluid chamber, a hollow sleeve secured to said housing, a flexible thermostatic element in said sleeve, a conductor tube surrounding said thermostatic element and capable of separately conducting fluid from said hot fluid chamber and said cold fluid to a point adjacent said thermostatic element; said fluids being mixed directly adjacent said thermostatic element, an outlet in said hollow sleeve, a manually adjustable member operatively secured to one end of said thermostatic element, and means secured to the other end of said thermostatic element for actuating said pin valve mechanism at times.

4. In combination with a thermostatic mixing chamber having therein a flexible helically wound thermostatic element and means for separately conducting hot and cold fluid thereto, a pressure actuated booster unit comprising, a housing, a cold fluid inlet in said housing designed to be in communication with a source of cold fluid under pressure, a hot fluid inlet in said housing designed to be in communication with a source of hot fluid under pressure, a chamber in said housing adjacent said hot fluid inlet, a second chamber in said housing adjacent said cold fluid inlet, a balanced valve mechanism in each of said hot and said cold fluid inlets for admitting fluid into said hot and said cold fluid chambers respectively at times, a compressible bellows element inside said housing, operatively secured to said balanced valve mechanisms, a passageway in said housing in communication between said hot fluid chamber and one side of said compressible bellows element, a pin valve mechanism imposed in said passageway, a second passageway in said housing in communication between said cold fluid chamber and the other side of said compressible bellows element, a pin valve mechanism imposed in said passageway, a hot fluid inlet in communication with said hot fluid chamber in said housing, a check valve imposed between said hot fluid inlet and said hot fluid chamber, a cold fluid outlet in said housing in communication with said cold fluid chamber, a check valve imposed between said cold fluid outlet and said cold fluid chamber, a sleeve chamber member secured to said housing and enclosing said flexible thermostatic element and means for separately conducting hot and cold fluid thereto, an outlet in said sleeve chamber, a means for operatively securing one end of said thermostatic element to said pin valve mechanisms for admitting fluid to either side of said compressible bellows element for actuating said balanced valves in said inlets at times, and a means for securing the other end of said thermostatic element to a manual control lever.

ERNEST A. HOOPES.